(12) United States Patent
Tian et al.

(10) Patent No.: US 12,328,167 B2
(45) Date of Patent: Jun. 10, 2025

(54) METHOD AND DEVICE FOR TRANSMITTING CHANNEL STATE INFORMATION

(71) Applicant: GUANGDONG OPPO MOBILE TELECOMMUNICATIONS CORP., LTD., Guangdong (CN)

(72) Inventors: Wenqiang Tian, Guangdong (CN); Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 460 days.

(21) Appl. No.: 17/724,441

(22) Filed: Apr. 19, 2022

(65) Prior Publication Data

US 2022/0247469 A1 Aug. 4, 2022

Related U.S. Application Data

(63) Continuation of application No. PCT/CN2019/113392, filed on Oct. 25, 2019.

(51) Int. Cl.
*H04B 7/06* (2006.01)
*H04B 7/08* (2006.01)

(52) U.S. Cl.
CPC ......... *H04B 7/0626* (2013.01); *H04B 7/0617* (2013.01); *H04B 7/0634* (2013.01); *H04B 7/086* (2013.01)

(58) Field of Classification Search
CPC ............ H04B 7/0626; H04B 17/3913; H04B 7/0632; H04B 7/024; H04B 7/0452;

(Continued)

(56) References Cited

U.S. PATENT DOCUMENTS

2018/0269950 A1\* 9/2018 John Wilson ......... H04L 5/0023
2018/0367192 A1 12/2018 O'Shea et al.
(Continued)

FOREIGN PATENT DOCUMENTS

CN 104811229 7/2015
CN 107171708 9/2017
(Continued)

OTHER PUBLICATIONS

WIPO, International Search Report and Written Opinion for PCT/CN2019/113392, Jul. 9, 2020.
(Continued)

*Primary Examiner* — Kharye Pope
(74) *Attorney, Agent, or Firm* — Hodgson Russ LLP (57) ABSTRACT

Disclosed are a method and a device for transmitting channel state information. The method comprises: a first device constructs a training set of a channel state information indication model that is used by the first device for transmitting channel state information, and the sample structure of the plurality of samples included in the training set being determined according to an M*N matrix structure, each line amongst the M rows of the matrix structure corresponding to a plurality of sub-carriers on the frequency domain or a preset duration on the time domain, each column amongst the N columns of the matrix structure corresponding to at least one antenna or a preset angle on the spatial domain, and each value in the matrix structure representing the channel quality of the corresponding frequency domain or spatial domain or representing the channel quality of the corresponding time domain or spatial domain.

20 Claims, 4 Drawing Sheets

(58) Field of Classification Search
CPC .. H04B 7/0456; H04B 7/0413; H04B 7/0697; H04B 17/309; H04L 5/0023; H04L 1/0026; H04W 24/02; H04W 72/542
See application file for complete search history.

(56) References Cited

U.S. PATENT DOCUMENTS

| | | | |
|---|---|---|---|
| 2020/0052757 A1* | 2/2020 | Wang | H04W 24/02 |
| 2020/0195334 A1* | 6/2020 | Zhou | H04B 7/088 |
| 2020/0259575 A1* | 8/2020 | Bai | H04B 17/24 |
| 2021/0067297 A1* | 3/2021 | Farmanbar | H04B 7/0417 |
| 2021/0091838 A1* | 3/2021 | Bai | H04B 7/0639 |
| 2021/0226682 A1* | 7/2021 | Park | H04L 5/005 |

FOREIGN PATENT DOCUMENTS

| | | |
|---|---|---|
| CN | 109672464 | 4/2019 |
| EP | 3979533 A1 | 4/2022 |

OTHER PUBLICATIONS

EPO, Extender European Search Report and Opinion for EP Application No. 19949856.9, Oct. 4, 2022.
Liao et al., CSI Feedback Based on Deep Learning for Massive MIMO Systems, IEEE Access, Jul. 17, 2019, pp. 86810-86820, vol. 7.
EPO, Communication for EP Application No. 19949856.9, Nov. 28, 2024.

* cited by examiner

METHOD AND DEVICE FOR TRANSMITTING CHANNEL STATE INFORMATION

CROSS-REFERENCE TO RELATED APPLICATION

This application is a continuation of International Application No. PCT/CN2019/113392, filed Oct. 25, 2019, the entire disclosure of which is incorporated herein by reference.

TECHNICAL FIELD

The present application relates to the field of communications, and in particular, to a method and device for transmitting channel state information.

BACKGROUND

The basic principles of current wireless communication systems are mostly based on theoretical modeling and parameter selection of the actual communication environment. With the further enhancement of requirements for flexibility, adaptability, speed, and capacity of wireless communication systems, the gains that can be brought by the conventional working mode of the wireless communication system based on the classical model theory are gradually weakening. At present, it is necessary to adopt new methods and ideas to combine with the conventional wireless communication theories and systems, so as to find another way to break the performance bottleneck and further improve the performance of the wireless communication system.

From a specific analysis point of view, taking the way of obtaining and indicating channel state information as an example, the related art mainly relies on a basic model and a pre-configured indicator parameter set for determining and indicating the channel state information. However, this method based on quantization and codebook often does not accurately reflect the current actual channel state information, and this error is not conducive to the accurate scheduling of channel resources in future communication systems, especially when large-scale MIMO is introduced, which may lead to the limitation of the upper limit of the system throughput.

Therefore, some new researches have been gradually carried out to address the above-mentioned problems, and one of them is the use of artificial intelligence to obtain and indicate the channel state information. In this type of method, first, the terminal or the base station needs to construct a training set of the channel state information indicator model, and use the training set to train and generate a neural network model. Then, the terminal can use the trained neural network to output the channel state information obtained in real time as indication information to be transmitted (for example, an indication vector). After the base station receives the indication information, it can use the corresponding trained neural network to restore the indication information to the actual channel state information.

From the current research results, the above method can better avoid the problem in the conventional model and codebook-based channel state information indication mechanism that an error between the channel state information after being restored and the real channel state information is large. However, there is a basic core problem in realization of the above design, that is, how to construct an effective training set of channel state information indicator model.

SUMMARY

The embodiments of the present application provide a method and device for transmitting channel state information, which can construct an efficient training set of channel state information indicator model, and then can train to obtain an effective channel state information indicator model.

In a first aspect, there is provided a method for transmitting channel state information, including: constructing, by a first device, a training set of channel state information indicator model, where the channel state information indicator model is used by the first device and a second device to transmit channel state information, sample structures of several samples included in the training set are determined according to an M*N matrix structure, each of M rows of the matrix structure corresponds to a plurality of subcarriers in a frequency domain or corresponds to a preset duration in a time domain, each of N columns of the matrix structure corresponds to at least one antenna in a spatial domain or corresponds to a preset angle in the spatial domain, and each value in the matrix structure represents a channel quality in the corresponding frequency domain and spatial domain, or represents a channel quality in the corresponding time domain and spatial domain, and M and N are positive integers.

In a second aspect, there is provided a method for transmitting channel state information, including: determining, by a second device, a channel state information indicator model, where the channel state information indicator model is used by the second device and a first device to transmit channel state information, the channel state information indicator model is determined according to a training set, sample structures of several samples included in the training set is determined according to an M*N matrix structure, each of M rows of the matrix structure corresponds to a plurality of subcarriers in a frequency domain or corresponds to a preset duration in a time domain, each of N columns of the matrix structure corresponds to at least one antenna in a spatial domain or corresponds to a preset angle in the spatial domain, each value in the matrix structure represents a channel quality in the corresponding frequency domain and spatial domain, or represents a channel quality in the corresponding time domain and spatial domain, and M and N are positive integers.

In a third aspect, there is provided a communication device for executing the method in the above-mentioned first aspect or each of its implementation manners. Specifically, the communication device includes a functional module for executing the method in the above-mentioned first aspect or each of its implementation manners.

In a fourth aspect, there is provided a communication device for executing the method in the above-mentioned second aspect or each of its implementation manners. Specifically, the communication device includes a functional module for executing the method in the above-mentioned second aspect or each of its implementation manners.

In a fifth aspect, there is provided a communication device, including a processor and a memory. The memory is configured to store a computer program, and the processor is configured to call and run the computer program stored in the memory to execute the method in the above-mentioned first aspect or each of its implementation modes.

In a sixth aspect, there is provided a communication device, including a processor and a memory. The memory is configured to store a computer program, and the processor is configured to call and run the computer program stored in the memory to execute the method in the above-mentioned second aspect or each of its implementation modes.

In a seventh aspect, a chip is provided for implementing the method in any one of the above-mentioned first aspect to the second aspect or each implementation manner thereof. Specifically, the chip includes: a processor, configured to call and run a computer program from a memory, so that a device installed with the chip executes the method in any one of the above-mentioned first aspect to the second aspect or any of the implementations thereof.

In an eighth aspect, a computer-readable storage medium is provided for storing a computer program that enables a computer to execute the method in any one of the first aspect to the second aspect or each implementation manner thereof.

In a ninth aspect, a computer program product is provided, including computer program instructions that cause a computer to execute the method in any one of the above-mentioned first aspect to the second aspect or each implementation manner thereof.

In a tenth aspect, there is provided a computer program, which, when runs on a computer, causes a computer to execute the method in any one of the above-mentioned first to second aspects or each implementation manner thereof.

Through the above technical solutions, the structural characteristics of the samples in the training set are set reasonably, and the structural characteristics of the samples in the training set are simplified. Since the training set is the basis for a neural network model to work effectively and efficiently, the efficiency of indicating the channel state information through the neural network model can be improved.

DETAILED DESCRIPTION

The technical solutions in the embodiments of the present application will be described below in conjunction with the drawings in the embodiments of the present application. Obviously, the described embodiments are part of the embodiments of the present application, not all of the embodiments. Based on the embodiments in the present application, all other embodiments obtained by a person of ordinary skill in the art without creative work shall fall within the protection scope of the present application.

The technical solutions of the embodiments of the present application may be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, etc.

Figure 1:
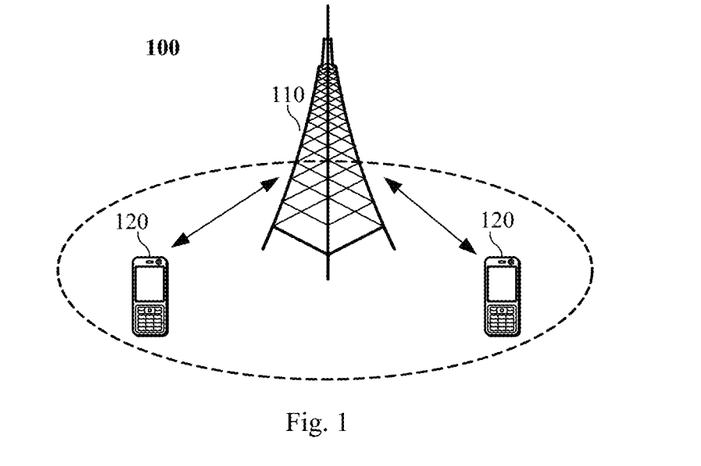
FIG. 1 is a schematic diagram of a communication system architecture provided by an embodiment of the present application.

Exemplarily, the communication system 100 applied in the embodiments of the present application is shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with a terminal device(s) located in the coverage area. Optionally, the network device 110 may be a base station (Base Transceiver Station, BTS) in a GSM system or a CDMA system, or a base station (NodeB, NB) in a WCDMA system, or an evolved base station (Evolutional Node B, eNB or eNodeB) in an LTE system, or a wireless controller in the Cloud Radio Access Network (CRAN), or the network equipment may be a mobile switching center, a relay station, an access point, a vehicle-mounted device, a wearable device, a hub, a switch, a bridge, a router, a network-side device in 5G networks, or a network device in the future evolution of the Public Land Mobile Network (PLMN), etc.

The communication system 100 also includes at least one terminal device 120 located within the coverage area of the network device 110. As used herein, the "terminal device" includes, but is not limited to, connection via wired lines, such as via Public Switched Telephone Networks (PSTN), Digital Subscriber Line (DSL), digital cables, and direct cable connections; and/or another data connection/network; and/or via a wireless interface, such as for cellular networks, Wireless Local Area Networks (WLAN), digital TV networks such as DVB-H networks, satellite networks, AM-FM broadcast transmitter; and/or an apparatus of another terminal device that is set to receive/send communication signals; and/or Internet of Things (IoT) equipment. A terminal device set to communicate through a wireless interface may be referred to as a "wireless communication terminal", a "wireless terminal" or a "mobile terminal". Examples of the mobile terminal include, but are not limited to, satellite or cellular phones; Personal Communications System (PCS) terminals that can combine cellular radio phones with data processing, fax, and data communication capabilities; PDAs that can include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to an access terminal, User Equipment (UE), a user unit, a user station, a mobile station, a mobile platform, a remote station, a remote terminal, mobile equipment, a user terminal, a terminal, wireless communication equipment, a user agent, or a user apparatus. The access terminal may be a cell phone, a cordless phone, a Session Initiation Protocol (SIP) phone, a Wireless Local Loop (WLL) station, a personal digital assistant (PDA), a handheld device, a computing device having a wireless communication function or other processing devices connected to wireless modems, an in-vehicle device, a wearable device, a terminal device in 5G networks, or a terminal device in the future evolution of PLMN, etc.

Optionally, direct terminal connection (Device to Device, D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include a plurality of network devices and the coverage of each network device may include other numbers of terminal devices, which is not limited in the embodiments of the present application.

Optionally, the communication system 100 may also include other network entities such as a network controller and a mobility management entity, which are not limited in the embodiments of the present application.

It should be understood that a device with a communication function in the network/system in the embodiments of the present application may be referred to as a communication device. Taking the communication system 100 shown in FIG. 1 as an example, the communication device may include a network device 110 and a terminal device 120 with communication functions, and the network device 110 and the terminal device 120 may be the specific devices described above, which will not be repeated here. The communication device may also include other devices in the communication system 100, such as a network controller, a mobility management entity, and other network entities, which are not limited in the embodiments of the present application.

It should be understood that the terms "system" and "network" in the present disclosure are often used interchangeably in the present disclosure. The term "and/or" in the present disclosure is only an association relationship that describes the associated objects, which means that there may be three relationships, for example, A and/or B may mean the following three situations: A exists alone, A and B exist at the same time, and B exists alone. In addition, the character "/" in the present disclosure generally indicates that the associated objects before and after are in an "or" relationship.

The indication of channel state information is very important in both the LTE system and the NR system, and it determines the performance of Multiple-Input Multiple-Output (MIMO) transmission. Generally speaking, the channel state information (Channel-State Information, CSI) indicator in the existing system may include a Channel Quality Indicator (CQI), a Precoding Matrix Indicator (PMI), a Rank Indicator (RI) and other information indicators.

Figure 2:
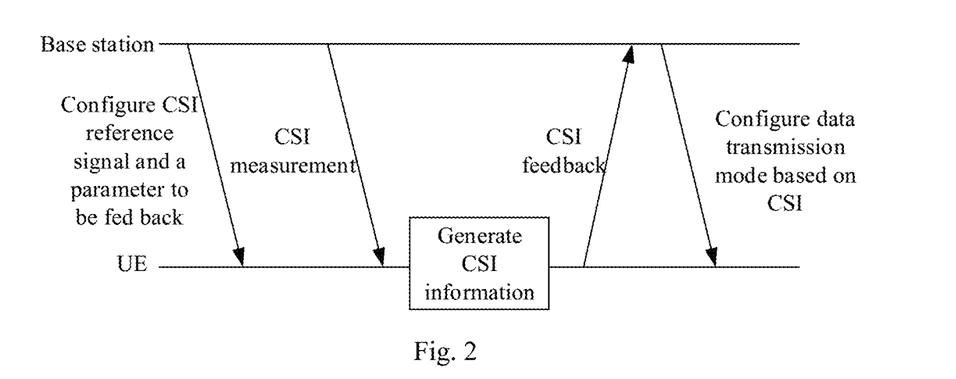
FIG. 2 is a schematic flowchart of a transmission process of channel state information provided by an embodiment of the present application.

FIG. 2 shows the CSI transmission process. As shown in FIG. 2, from the perspective of the process, the base station may first configure the indication parameter information for CSI indicator. For example, the base station configures that the UE needs to indicate which information among the CQI, PMI, RI and other information. At the same time, the base station may configure some reference signals for CSI measurement, such as a Synchronization Signal Block (SSB) or a Channel-State Information Reference Signal (CSI-RS). By measuring the above-mentioned reference signals, the UE determines the current channel state information and determines the indication parameter information, and indicates the current channel state information to the base station, so that the base station configures a reasonable and efficient data transmission method based on the current channel condition.

In recent years, Artificial Intelligence (AI) research represented by neural networks has achieved great results in many fields, and it will also play an important role in people's production and life for a long time in the future.

Figure 3:
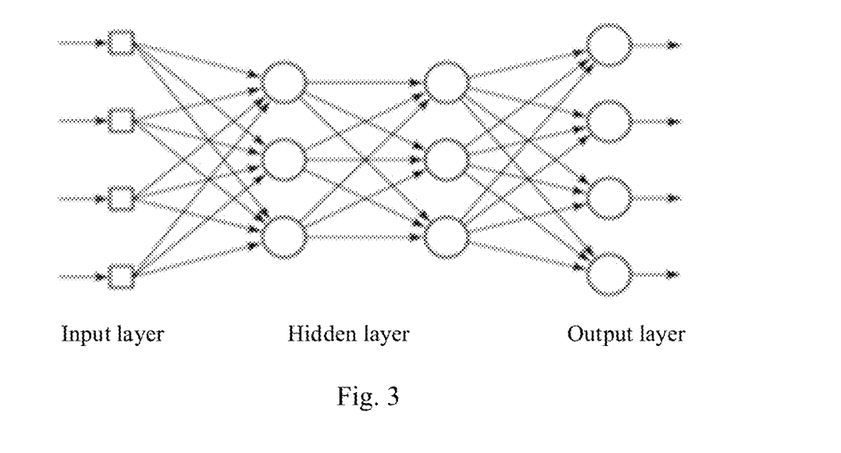
FIG. 3 is a basic structure of a neural network provided by an embodiment of the present application.

FIG. 3 shows a basic structure of a neural network. Generally, the basic structure of a simple neural network includes: an input layer, a hidden layer and an output layer, for example, as shown in FIG. 3. The input layer is responsible for receiving data, the hidden layer is for processing the data, and the final result is produced in the output layer. Among them, each node represents a processing unit, which can be thought of as simulating a neuron. Multiple neurons form a layer of neural network, and multiple layers of information transmission and processing construct a whole neural network.

Figure 4:
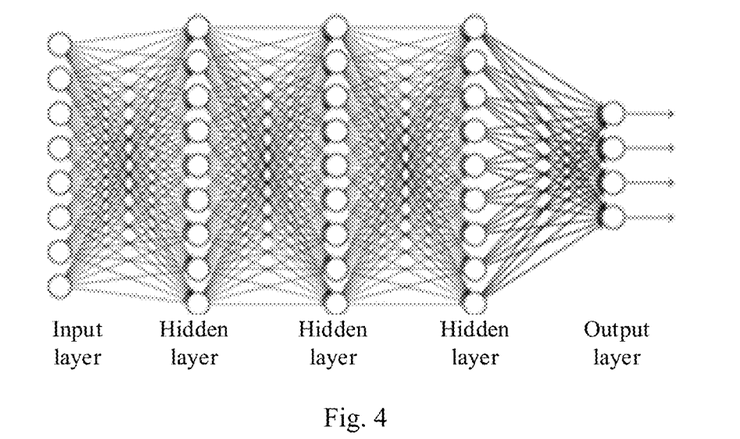
FIG. 4 is a schematic diagram of a neural network structure with multiple hidden layers provided by an embodiment of the present application.

With the continuous development of neural network research, in recent years, neural network deep learning algorithms have been proposed, and more hidden layers have been introduced. For example, FIG. 4 shows a schematic diagram of a neural network structure with multiple hidden layers. As shown in FIG. 4, the feature learning is carried out through layer-by-layer training of neural networks with multiple hidden layers, which greatly improves the learning and processing capabilities of neural networks, and is widely used in pattern recognition, signal processing, optimized combination, and anomaly detection.

However, the basic principles of current wireless communication systems are mostly based on theoretical modeling and parameter selection of the actual communication environment. As the requirements for flexibility, adaptability, speed, and capacity of wireless communication systems are further enhanced, the gains that a traditional wireless communication system based on classical model theory can bring are gradually weakening. It is now necessary to adopt new methods and ideas to combine with the traditional wireless communication theories and systems to use another way to break the performance bottleneck, and further improve the performance of the wireless communication system.

From a specific analysis point of view, taking the way of obtaining and indicating channel state information as an example, the related art mainly relies on a basic model and a pre-configured indicator parameter set for determining and indicating CSI, for example, as shown in FIG. 2. This quantization and codebook-based approach often does not accurately reflect the current actual channel state information, and this error is not conducive to the accurate scheduling of channel resources in future communication systems, especially under circumstance in which massive MIMO is introduced, this will result in the limitation of the upper limit of the system throughput. At present, some new researches have been gradually carried out to address the above-mentioned problems, and the use of artificial intelligence to obtain and indicate CSI is one of them.

Figure 5:
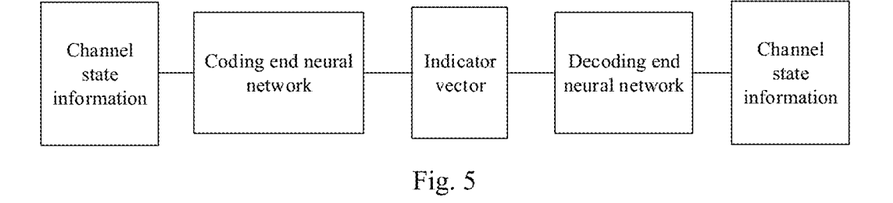
FIG. 5 is a network architecture of using a neural network model to indicate channel state information according to an embodiment of the present application.
Figure 6:
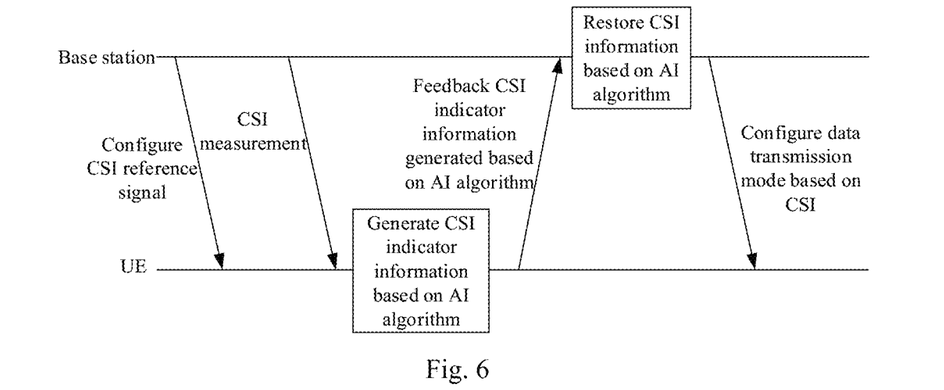
FIG. 6 is a flow chart of using a neural network model to indicate channel state information according to an embodiment of the present application.

FIG. 5 shows a new network architecture that uses a neural network model to indicate channel state information, and FIG. 6 shows a flow chart of using a neural network model to indicate channel state information. In this type of method, first, the UE or the base station needs to construct a training set of the channel state information indicator model, and use the training set to train and generate a neural network model. Then, the UE may use the trained neural network to output the real-time obtained CSI information as indication information to be transmitted (for example, an indication vector). After receiving the indication information, the base station may use the corresponding trained neural network to restore the indication information to the actual channel state information. From the current research results, the above method can better avoid the problem of large error between the CSI information after restoration and the real CSI information in the traditional model and codebook-based CSI indication mechanism.

A basic core problem for realizing the above design is how to construct an effective training set of channel state information indicator model. The effective training set is the basis for the indicator model to work effectively and efficiently.

For example, a basic method of constructing a channel state information indicator model training set may be used, that is, a matrix of size M*N is used as the channel state information training set, which includes M-dimensional subcarriers and N-dimensional antenna numbers, and the matrix expresses the channel quality conditions of individual subcarriers and individual antennas (for example, dbm value). The above method is effective, but there is still a lot of room for improvement in terms of efficiency. For example, in a network system in which 30 k subcarriers form a cell bandwidth of 100 M bandwidth (calculated according to 273 resource blocks (RBs)), the above-mentioned M-dimensional subcarrier requires 3276 subcarriers. After considering the antenna dimensions, a sample size of a single training set will reach an order of approximately Mbit, and considering that a large number of training sets are required for neural network training, the above-mentioned training set of channel state information will appear unusually large and its availability will be affected. With respect to the foregoing problem, the embodiment of the present application proposes a method for transmitting channel state information.

Figure 7:
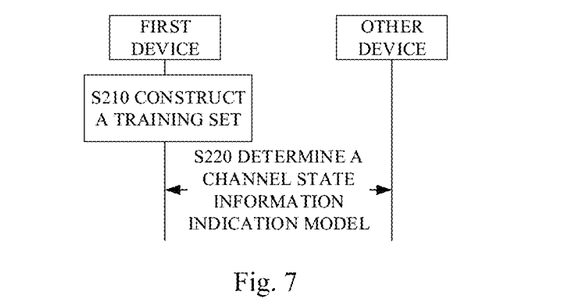
FIG. 7 is a schematic flowchart of a method for transmitting channel state information according to an embodiment of the present application.

FIG. 7 is a schematic flowchart of a method 200 for transmitting channel state information according to an embodiment of the present application. As shown in FIG. 7, the method 200 includes: S210, constructing a training set, that is, the first device constructing a training set of channel state information indicator model, where the channel state information indicator model may be used for transmission of channel state information.

It should be understood that the first device in the embodiments of the present application may be any device. For example, the first device may be a terminal device or a network device. For example, the terminal device may be a terminal device as shown in FIG. 1, and the network device may be a network device as shown in FIG. 1, which is not limited in the embodiments of the present application.

In S210, the first device constructs a training set, the training set includes several samples, each sample has a corresponding sample structure, the sample structure may be determined according to an M*N matrix structure, that is, the sample structure may be the M*N matrix structure, or the sample structure may also be other structure determined through deformation or transformation according to the M*N matrix structure, which is not limited in the embodiments of the present application.

Figure 8:
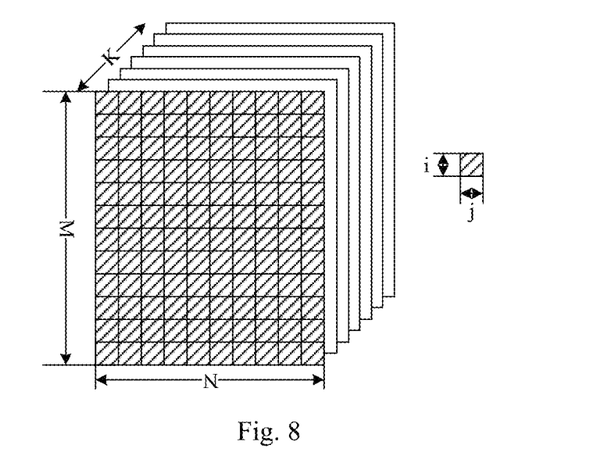
FIG. 8 is a schematic diagram of an M*N matrix structure provided by an embodiment of the present application.

The following first introduces the M*N matrix structure. Each of the M rows of the matrix structure corresponds to a plurality of subcarriers in the frequency domain or corresponds to a preset duration in the time domain, and each of the N columns of the matrix structure corresponds to at least one antenna in the spatial domain or corresponds to a preset angle in the spatial domain, each value in the matrix structure represents the channel quality in the corresponding frequency domain and spatial domain, or represents the channel quality in the corresponding time domain and the spatial domain, M and N are positive integers, and M and N may be equal or different.

Specifically, FIG. 8 shows a schematic diagram of the M*N matrix structure of an embodiment of the present application. As shown in FIG. 8, the M*N matrix structure includes two dimensions, which may be called the first dimension and the second dimension here, where the parameter corresponding to the first dimension is M, and the parameter corresponding to the second dimension is N.

For the first dimension, the parameter M corresponding to the first dimension may be regarded as M rows, each of which may correspondingly represent the frequency domain or the time domain, that is, the first dimension may be the frequency domain dimension or the time domain dimension, or the parameter M represents the frequency domain dimension or the time domain dimension. For ease of description, the following is an example of any row, i.e., the $i^{th}$ row, of the M rows, and i may take any integer from 1 to M.

Optionally, for the case where the first dimension is the frequency domain dimension, that is, each row in the M rows may represent the frequency domain, for example, each row may correspond to a plurality of subcarriers in the frequency domain. For example, for the $i^{th}$ row, it may correspondingly represents a RBs, where a is greater than or equal to 1, for example, the $i^{th}$ row may correspond to 2 RBs, 4 RBs, or 8 RBs, and each RB includes 12 subcarriers. For another example, the $i^{th}$ row may also correspondingly represent b subcarriers, where b is greater than 1, for example, the $i^{th}$ row correspondingly represents 4 subcarriers, 6 subcarriers, or 18 subcarriers. When the first dimension is the frequency domain dimension, if the sample structure of a single sample in the training set is an M*N matrix structure, then the frequency domain range indicated by the single sample is the frequency domain range of M*b, where b means the number of subcarriers corresponding to every row. At this time, compared to the case where each row only represents one subcarrier, the size of the sample structure in the training set can be reduced.

Optionally, the first dimension may also be a time domain dimension, that is, each row in the M rows may represent the time domain, for example, each row may correspond to a preset duration in the time domain, where the preset duration may be set according to actual applications, and the preset duration may indicate a certain amount of delay. For example, for the $i^{th}$ row, it may correspond to p1 microseconds, or p2 symbol length, or the number of sampling points of p3 symbols. The symbol mentioned here may be an Orthogonal Frequency Division Multiplexing (OFDM) symbol. When the first dimension is the time domain dimension, if the sample structure of a single sample in the training set is an M*N matrix structure, then the time-domain range indicated by the single sample is the duration of M*p, and p means that the preset duration is p.

For the second dimension, the parameter N corresponding to the second dimension may be regarded as N columns, each of which may correspondingly represent a spatial domain, that is, the second dimension may be a spatial domain dimension, or the parameter N represents a spatial domain dimension. For ease of description, the following takes any one of the N columns, i.e., the $j^{th}$ column as an example for description, where j may be any integer from 1 to N.

Optionally, if the second dimension is the spatial domain dimension, the $j^{th}$ column in the N columns may indicate the number of antennas in the spatial domain, for example, the $j^{th}$ column may indicate one or more antennas. When the second dimension is the spatial domain dimension, if the sample structure of a single sample in the training set is an M*N matrix structure, then the number of antennas indicated by the single sample is the duration of N*l, and l represents the number of the antennas corresponding to each column.

Optionally, if the second dimension is the spatial domain dimension, the $j^{th}$ column in the N columns may also indicate an angular size of the spatial domain, for example, the $j^{th}$ column may indicate a preset angle. When the second dimension is the spatial domain dimension, if the sample structure of a single sample in the training set is an M*N matrix structure, then the angle indicated by the single sample is the duration of N*q, and q represents the size of the preset angle corresponding to each column. For example, it is possible to set N*q=2π(that is, 360°), and then determine the value of q in each column according to the value of N.

It should be understood that for the two dimensions of the M*N matrix structure, the possible meanings of each dimension are respectively given, and they may be combined arbitrarily, and for any combination of dimensions, the channel quality indicator on the combination represents the channel quality indicator condition under the specific dimension combination. For example, the M*N matrix structure may represent a combination of the frequency domain dimension and the spatial domain dimension, where the spatial domain dimension is an antenna, then the indicator value X at any position in the M*N matrix structure, such as the indicator value X at the third row and sixth column, may be used to indicate the channel quality condition of the third group of specific bandwidths on the sixth antenna, and the third group of specific bandwidths may include a plurality of subcarriers. For another example, the M*N matrix structure may also represent the combination of the time domain dimension and the spatial domain dimension, where the spatial domain dimension is an angle, then the indicator value Y at any position in the M*N matrix structure, such as the indicator value Y in the fourth row and the fifth column may be used to indicate the channel quality condition of the fourth specific delay length at the fifth angle of arrival. In addition to these two combinations, there may be other combinations. For the sake of brevity, they will not be illustrated one by one here.

In the embodiments of the present application, the above-mentioned M*N matrix structure may be used to determine the sample structure. For example, the sample structure may be the M*N matrix structure. Then, correspondingly, each dimension of the sample structure may also mean the above-mentioned different meanings, which will not be repeated here.

Optionally, the sample structure may also be obtained by transforming the M*N matrix structure. For example, the sample structure may include at least one of the following: N*M matrix structure, 1*(M*N) vector structure, (M*N)*1 vector structure, m*N matrix structure, M*n matrix structure and m*n matrix structure, where M is greater than m, and N is greater than n. Alternatively, based on the above-mentioned similar transformations, the sample structure may also be other structures. For example, the sample structure may also be a vector structure of (m*n)*1, which is not limited by the embodiments of the present application. For the sake of brevity, examples are not given one by one.

For the case where the sample structure is an N*M matrix structure, it is obtained by transposing the original M*N matrix structure, that is, the rows and columns of the M*N matrix structure are exchanged.

For the 1*(M*N) vector structure or the (M*N)*1 vector structure, it is obtained by combining the original M*N matrix structure into a one-dimensional vector structure. The specific transformation may be transforming the first dimension and then transforming the second dimension, or may be transforming the second dimension first and then transforming the first dimension. Such transformations are different in expression form.

In the case of m*N matrix structure, M*n matrix structure or m*n matrix structure, the first device may appropriately compress the M*N matrix structure and determine it as a sample structure, that is, it may select at least part of M*N matrix structure as the sample structure to reduce the size of each sample in the training set. Specifically, the method 200 may include: the first device compressing M rows into m rows, for example, selecting and retaining m rows among the M rows, and deleting the remaining M−m rows, that is, making the sample structure include m rows of data. Similarly, the method 200 may also include: the first device transforming the N columns of the matrix structure into n columns, that is, the sample structure including n columns of data.

Figure 9:
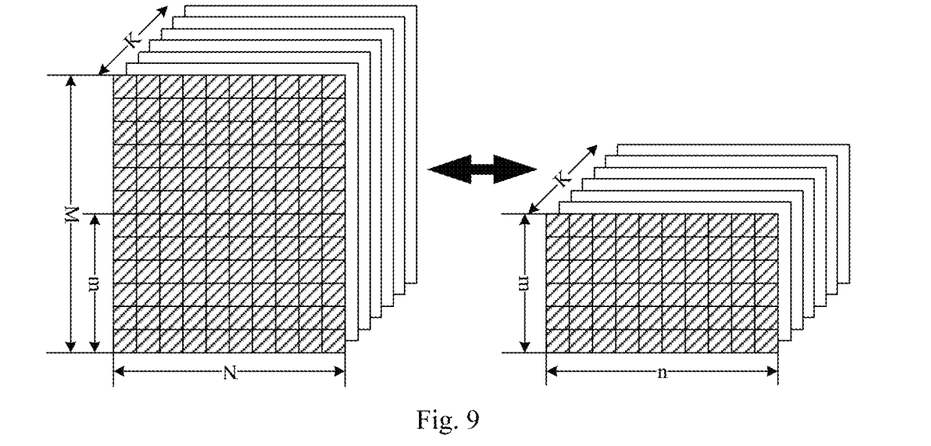
FIG. 9 is a schematic diagram of a parameter M in a compressed matrix structure provided by an embodiment of the present application.

Specifically, FIG. 9 shows a schematic diagram of the parameter M in the compressed matrix structure of an embodiment of the present application. As shown in FIG. 9, the first device may compress M rows into m rows, which may include: the first device selecting and retaining m rows from the M rows, and deleting the remaining M−m rows. For example, the first device retains the values from the $1^{st}$ to $m^{th}$ rows in the M rows of the matrix structure, and deletes the values of the last M−m rows in the M rows of the matrix structure, M being greater than m, so that the sample structure includes m rows. Taking the parameter M in the M*N matrix structure representing the time domain dimension as an example, the first device may select the m rows according to the delay requirement, for example, the time domain range (or the total time in the time domain, or the size of the delay) corresponding to each row in the first m rows of the matrix structure is less than or equal to a threshold, and after m rows, the corresponding total time in the time domain is greater than the threshold.

In the time domain, since the channel quality corresponding to the excessive delay corresponds to the channel quality condition on the multipath that has a long deviation from the main path in the multipath, in this case, it is possible to select to eliminate the values corresponding some of the excessive delay, thereby reducing the size of the training set. For example, the size of the first dimension may be reduced from M to m. For example, assuming that the M*N matrix structure is a 512*32 size matrix, where the delay granularity in the time domain is 0.1 microseconds, that is, each row corresponds to a period of 0.1 microseconds; the angular granularity in the spatial domain is ($2\pi/32$), the 512 delay granularities correspond to more than 50 microseconds, then some training set samples with excessive delay may be selected to be eliminated. For example, only 64 delay granularity sizes are retained in the time domain, that is, only the data with the total delay length being less than 6.4 microseconds is retained, i.e., the first 64 rows in the 512 rows of data are selected as the sample data in the training set.

Figure 10:
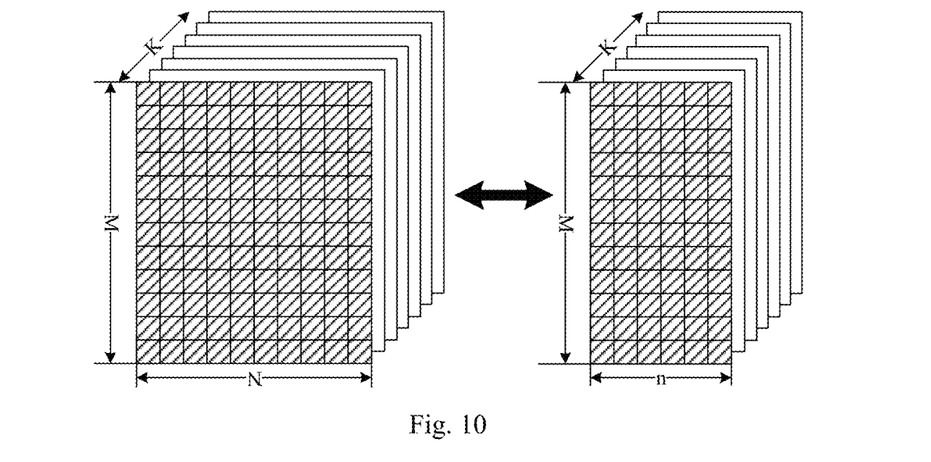
FIG. 10 is a schematic diagram of a parameter N in a compressed matrix structure provided by an embodiment of the present application.

Similarly, FIG. 10 shows a schematic diagram of the parameter N in the compressed matrix structure of an embodiment of the present application. As shown in FIG. 10, the first device transforms the N columns of the matrix structure into n columns, which may include: the first device selecting n columns among the N columns to retain, and deleting the remaining N−n columns, that is, the sample structure includes n columns of data; or, it may also include: the first device combining the N columns of data into n columns of data according to a certain rule.

For example, the first device may randomly reserve the values of n columns in N of the matrix structure, and delete the values of other N−n columns in the N columns of the matrix structure.

For another example, the first device retains only one column in every k columns from the first column in the N columns of the matrix structure, and deletes the other k−1 columns in each k column; or, the first device combines every k columns from the first column in the N columns of the matrix structure into one column, thereby transforming the N columns of data into n (n is approximately equal to Q/k) columns of data. Specifically, taking the parameter N in the M*N matrix structure representing the angular dimension of the spatial domain as an example, an extraction method may be used to determine n columns of data. For example, assuming that each of the N columns represents a certain angle size, starting from the first column, every k columns may be combined into one column. For example, if k is set to 2, then for N columns of data, every two columns may be combined into one column. The combination here may include: deleting data in the even-numbered column and retaining only data in the odd-numbered column; or deleting data in the odd-numbered column, and only retaining data in the even-numbered columns; or, taking the average of every two columns and combining them into one column. For another example, k takes 3, that is, every three columns are combined into one column. The combination may include: randomly selecting one column from every three columns and deleting the other two columns, or taking an average value for every three columns, so as to form one column.

In the embodiment of the present application, the sample structure may be obtained based on the M*N matrix structure. For ease of description, the following takes the sample structure as the M*N matrix structure as an example for description, and it is applicable that the sample structure is other structures obtained based on the M*N matrix structure.

It should be understood that due to the different meanings of the parameters M and N in the M*N matrix structure, the meanings of different dimensions of the corresponding sample structure are also different, and the different meanings may be obtained through appropriate transformations, for example, Fourier transform. Specifically, the method 200 may further include at least one of the following steps: if each row in the M rows of the matrix structure corresponds to a plurality of subcarriers in the frequency domain, the first device uses Fourier transform to transform each row of the M rows in the matrix structure to correspond to the preset duration in the time domain; on the contrary, if each row in the M rows of the matrix structure corresponds to the preset duration in the time domain, the first device uses Fourier transform to transform each row of the M rows in the matrix structure to correspond to a plurality of subcarriers in the frequency domain; if each of the N columns of the matrix structure corresponds to at least one antenna in the spatial domain, the first device transforms each of the N columns of the matrix structure to correspond to a preset angle in the spatial domain through Fourier transform; on the contrary, if each of the N columns of the matrix structure corresponds to a preset angle in the spatial domain, the first device transforms each of the N columns of the matrix structure to correspond to at least one antenna in the spatial domain through Fourier transform.

For example, it is assumed that the first device determines the first training set, the first training set includes 100,000 samples, each sample is composed of a 512*32 matrix, where "512" corresponds to the frequency domain dimension, and the frequency domain granularity is a RB of one 30 kHz, that is, one row corresponds to one RB, there is a total of 512 RBs; "32" corresponds to the spatial domain dimension, and the spatial domain granularity is one antenna, that is, one column corresponds to one antenna, and there is a total of 32 antennas. After the above-mentioned first training set is transformed by DFT, a second training set may also be obtained. The second training set is still a 512*32 matrix, where "512" corresponds to the time domain dimension, and the time domain granularity is $1/(0.36*Nf)$ microseconds, that is, one row corresponds to $1/(0.36*Nf)$ microseconds, where Nf is an integer, which may be the point number of DFT; "32" corresponds to the spatial domain dimension, and the spatial domain granularity is $2\pi/32$, that is, the angle size corresponding to each row is $2\pi/32$.

The above-mentioned first training set may be converted into the second training set, and similarly, the second training set may also be converted into the first training set. Alternatively, only one dimension may be transformed in the first training set or the second training set. For example, for the first training set, only the frequency domain dimension may be transformed to the time domain dimension, and the spatial domain dimension may not be transformed, or only the spatial domain dimension may be transformed, and the frequency domain dimension is not transformed, but the embodiments of the present application are not limited thereto.

In the embodiments of the present application, the training set may include several samples. For example, as shown in FIG. 8, each sample structure is an M*N matrix structure, and the training set may include K samples, that is, K M*N. Generally speaking, K is a very large number, such as $10^4$ or $10^5$.

The different samples in the K samples in the training set may be obtained based on different channel conditions, such as indoor, outdoor, urban, rural and other different environments. Specifically, the difference between different samples may come from difference of one or more of the following factors that affect the channel: a delay spread, an azimuth angle-of-departure spread (AOD spread), an azimuth angle-of-arrival spread (AOA spread), a zenith angle-of-departure spread (ZOD spread), a zenith angle-of-arrival spread (ZOA spread), a Shadow fading, a number of multipath cluster (number of cluster N), a number of rays in a multipath cluster (number of rays per cluster M), an intra-cluster delay spread (Cluster DS), an intra-cluster azimuth angle-of-departure spread (Cluster ASD), an intra-cluster azimuth angle-of-arrival spread (Cluster ASA), an intra-cluster zenith angle-of-departure spread (Cluster ZSD), an intra-cluster zenith angle-of-arrival spread (Cluster ZSA), and an intra-cluster shadow fading distribution (per cluster shadowing std), but the embodiments of the application is not limited thereto.

In the embodiments of the present application, S210 may further include: the first device determining a sample structure, so that the first device collects samples according to the sample structure, and then constructs the training set. Specifically, according to the foregoing content, the sample structure determined by the first device may be determined based on the M*N matrix structure, and the determination of the sample structure by the first device may specifically include: determining a related parameter of the sample structure. Since the sample structure is determined based on the M*N matrix structure, the related parameter may include at least one of the parameters M, N, m, and n. For example, determining the sample structure by the first device includes: the first device determining that the sample structure is an M*N matrix structure, and the meanings and specific values of the parameters M and N; or, the first device determining that the sample structure is m*N, and the meaning and specific values of the parameters m and N, which are not listed here for brevity.

Optionally, the first device may determine the sample structure in many ways. For example, the first device may select the sample structure by itself; or other device may determine the sample structure and send it to the first device, the embodiments of the present disclosure are not limited thereto.

Specifically, in the case where the first device determines the sample structure by itself, the first device may determine the corresponding sample structure according to the model structure used when establishing the channel state information indicator model; or, the first device may also select a suitable sample structure based on other information. In addition, the first device may also send the determined sample structure to other device. For example, the first device sends sample structure information to other device, where the sample structure information is used to indicate the sample structure determined by the first device, so that other device may determine the sample structure.

For the case where the first device receives the sample structure determined by other device, in order to facilitate the distinction, said other device is referred to as a third device, and the third device determines the sample structure. For example, the third device may determine the corresponding sample structure according to the module structure used when establishing the channel state information indicator model; or, the third device may also select a suitable sample structure based on other information. The third device sends sample structure information to the first device, where the sample structure information is used to indicate the sample structure determined by the third device, so that the first device may determine the sample structure based on the sample structure information.

It should be understood that the third device may be any device different from the first device. For example, the third device may be a terminal device or a network device, such as the terminal device or the network device shown in FIG. 1, but the embodiments of the present application are not limited thereto.

In S210, the first device collects samples according to the sample structure, and determines a training set consisting of several samples. As shown in FIG. 7, the method 200 further includes: S220, determining a channel state information indicator model, that is, the first device or other device determining the corresponding channel state information indicator model according to the determined training set.

That is, for the training set determined by the first device, the first device may further establish a channel state information indicator model based on the training set; or, other device other than the first device may also establish a channel state information indicator model, for example, the first device may send the training set to other device, so that other device may determine the corresponding channel state information indicator model according to the training set. In order to facilitate the distinction, said other device is referred to as a second device here. The second device may be any device other than the first device. For example, the second device may be a terminal device or a network device; for another example, the second device may be the foregoing third device, or may also be another device different from the third device, and the embodiments of the present application are not limited thereto.

Two possible implementation manners of the foregoing S220 will be described in detail below in conjunction with different embodiments.

Optionally, as a first embodiment, S220 may include: the first device determining the channel state information indicator model. Specifically, determining the channel state information indicator model by the first device according to the training set may include: the first device determining the channel state information indicator model based on the training set and the model structure of the channel state information indicator model. Correspondingly, the method 200 may further include: the first device determining the model structure.

Since the dimensional characteristics (dimension size) of the samples in the training set and the model structure need to match, if the sample structure in the training set and model structure are generated in the same device, the device can autonomously determine a unified sample structure and model structure; but if the sample structure in the training set and the model structure are determined by different devices, then methods should be taken to ensure that the sample structure in the training set and model structure are matched.

Therefore, the first device may determine the model structure in many ways. For example, the first device may determine the model structure by itself; or receive the model structure determined by other device.

Specifically, for the case where the first device determines the model structure by itself, the first device may determine the model structure corresponding to the sample structure based on the sample structure; or the first device may also determine the model structure based on other information. If the first device determines the model structure corresponding to the sample structure according to the sample structure, the method for the first device to determine the sample structure may adopt the method described in S210. For brevity, details are not repeated here. For example, the first device may receive the sample structure information sent by the third device, determine the sample structure according to the sample structure information, and then determine the model structure corresponding to the sample structure.

In addition, the first device may also send the determined model structure to other device. For example, the first device sends model structure information to other device, where the model structure information is used to indicate the sample structure determined by the first device, so as to facilitate other device to determine the model structure.

Optionally, for the case where the first device receives the model structure determined by other device, in order to facilitate the distinction, said other device is referred to herein as a third device, that is, the third device determines the model structure. The third device may be any device different from the first device; the third device may be the same device as the second device, or it may be a different device from the second device; and, the third device is usually the same device as the third device involved in S210, but in some scenarios, it may also be a different device from the third device in S210. Here, the third device and the third device in S210 being the same device is taken as an example. For example, the third device may be a terminal device or a network device, such as the terminal device or the network device as shown in FIG. 1, and the embodiments of the present application are not limited thereto.

Specifically, the third device determines the model structure of the channel state information indicator model, and then sends the model structure information to the first device. The model structure information is used to indicate the model structure determined by the third device so that the first device may determine the model structure according to the model structure information. The determining the model structure by the third device may include: the third device determining a model structure corresponding to the sample structure according to the sample structure; or, the third device determining the model structure according to other information. If the third device determines a model structure corresponding to the sample structure based on the sample structure, the sample structure may be determined by the third device itself, or the sample structure may also be sent by other device to the third device. For example, the first device sends the sample structure information to the third device, the sample structure information indicates the sample structure, and the third device determines the sample structure according to the sample structure information; then determines the model structure relative to the sample structure, such that the third device sends the model structure information to the first device, and the model structure information is used by the first device to determine the model structure.

It should be understood that the channel state information indicator model determined for the first device may be used for the first device to transmit channel state information, that is, it may be used for the transmission of channel state information between the first device and any other one or more devices, for example, the transmission of channel state information between the first device and the second device. Specifically, the method 200 may further include: the first device sending the channel state information indicator model to the second device, so that the channel state information indicator model is used to transmit the channel state information between the first device and the second device. The channel state information indicator model sent by the first device to other device may include related parameters of the channel state information indicator model, for example, may include: a model structure and a model parameter of the channel state information indicator model, and a related parameter of the training set of the channel state information indicator model, and the embodiments of the present application are not limited thereto.

Optionally, as a second embodiment, S220 may include: the second device determining the channel state information indicator model. Similar to the process of determining the channel state information indicator model by the first device, the second device may determine the channel state information indicator model based on the training set, or further, the second device may determine the channel state information indicator model based on the training set and the model structure.

Specifically, the method 200 further includes: the first device sending the training set to the second device, so that the second device may determine the training set, and then determines the channel state information indicator model according to the received training set.

Optionally, the method 200 further includes: the second device determining the model structure. Similar to the process in which the first device determines the model structure, the second device may also determine the model structure in a variety of ways. For example, the second device may determine the model structure by itself, for example, determine the model structure corresponding to the sample structure; or the second device may also receive the model structure information sent by other device (for example, the first device or the third device or other devices), and determine the model structure according to the model structure information, which are not elaborated here for the sake of brevity.

It should be understood that the channel state information indicator model determined by the second device may be used for the second device to transmit channel state information, that is, it may be used for the transmission of channel state information between the second device and any one or more other devices, for example, the transmission of channel state information between the second device and the first device. Specifically, the method 200 may further include: the second device sending the channel state information indicator model to the first device, so that the channel state information indicator model is used between the first device and the second device to transmit the channel state information. The channel state information indicator model sent by the second device to other device may include a relevant parameter of the channel state information indicator model, for example, may include: a model structure and a model parameter of the channel state information indicator model, and a relevant parameter of the training set of the channel state information indicator model, and the embodiments of the present application are not limited thereto.

It should be understood that the "transmission" in the embodiments of the present application may include receiving and/or sending. For example, the transmission of channel state information between the first device and the second device may include: the first device sending the channel state information to the second device, or the second device sending the channel state information to the first device. In addition, the channel state information in the embodiments of the present application may be transmitted between the terminal device and the network device, or between different terminal devices, or between different network devices, and the embodiments of the present application are not limited thereto.

Considering that for the neural network model, the training set is the basis for a neural network model to work effectively and efficiently, then when the neural network model is introduced to indicate the channel state information, how to construct the corresponding training set and how to determine the structural characteristics of the corresponding training set are important questions. Therefore, the method for transmitting channel state information in the embodiments of the present application reasonably sets the structural characteristics of the samples in the training set, and simplifies the structural characteristics of the samples in the training set; in addition, it also solves the problem of mismatching between the training set and the model structure that may be occurred when the training set and the model structure are determined on different devices, thereby improving the efficiency of channel state information indicator through the neural network model.

It should be understood that, in the various embodiments of the present application, the size of the sequence numbers of the above-mentioned processes does not mean the order of execution, and the execution order of each process should be determined by its function and internal logic, and should not constitute any limitation on the implementation process of the embodiments of the present application.

The foregoing describes in detail the method for transmitting channel state information according to an embodiment of the present application with reference to FIGS. 1 to 10, and the following describes the device according to the embodiments of the present application with reference to FIGS. 11 to 15.

Figure 11:
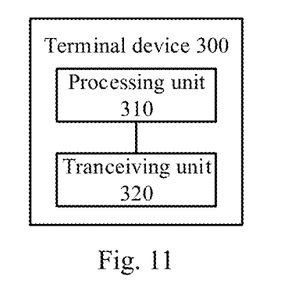
FIG. 11 is a schematic block diagram of a first device provided by an embodiment of the present application.

As shown in FIG. 11, the first device 300 for transmitting channel state information according to an embodiment of the present application includes: a processing unit 310; optionally, it may further include a transceiving unit 320. Specifically, the processing unit 310 is configured to: construct a training set of channel state information indicator model, where the channel state information indicator model is used by the first device and a second device to transmit channel state information, and sample structures of several samples included in the training set are determined according to an M*N matrix structure, each of the M rows of the matrix structure corresponds to multiple subcarriers in the frequency domain or corresponds to a preset duration in the time domain, each of the N columns of the matrix structure corresponds to at least one antenna in the spatial domain or corresponds to a preset angle in the spatial domain, and each value in the matrix structure represents the channel quality in the corresponding frequency domain and spatial domain, or represents the channel quality in the corresponding time domain and spatial domain, and M and N are positive integers.

Optionally, as an embodiment, the processing unit 310 is further configured to perform at least one of the following steps: if each row of the M rows of the matrix structure corresponds to multiple subcarriers in the frequency domain, transforming each of the M rows of the matrix structure to correspond to the preset duration in the time domain through Fourier transform; if each row of the M rows of the matrix structure corresponds to the preset duration in the time domain, transforming each of the M rows of the matrix structure to correspond to multiple subcarriers in the frequency domain through Fourier transform; if each of the N columns of the matrix structure corresponds to at least one antenna in the spatial domain, transforming each of the N columns of the matrix structure to correspond to a preset angle in the spatial domain through Fourier transform; if each of the N columns of the matrix structure corresponds to a preset angle in the spatial domain, transforming each of the N columns of the matrix structure to correspond to at least one antenna in the spatial domain through Fourier transform.

Optionally, as an embodiment, the processing unit 310 is configured to: according to the delay requirement, retain the values from the first row to the $m^{th}$ row in the M rows of the matrix structure, and delete the values of the last M−m rows in the M rows of the matrix structure, M is greater than m, and the sample structure includes m rows.

Optionally, as an embodiment, the time domain range corresponding to each row in the first m rows of the matrix structure is less than or equal to a threshold value, and the time domain range corresponding to each row in the last M−m rows is greater than the threshold value.

Optionally, as an embodiment, the processing unit 310 is configured to: transform N columns of the matrix structure into n columns, where N is greater than n, and the sample structure includes n columns.

Optionally, as an embodiment, the processing unit 310 is configured to: randomly retain the values of n columns in N of the matrix structure, and delete the values of other N−n columns in the N columns of the matrix structure; or, only retain one column for every k columns from the first column in the N columns of the matrix structure, and delete the other k−1 columns in every k columns; or, combine every k columns from the first column in the N columns of the matrix structure into one column.

Optionally, as an embodiment, the sample structure is any one of the following: the M*N matrix structure, the N*M matrix structure, the 1*(M*N) vector structure, and (M*N)*1 vector structure.

Optionally, as an embodiment, the factors affecting the difference between any two of the several samples include at least one of the following: a delay spread, an azimuth angle-of-departure spread, an azimuth angle-of-arrival spread, a zenith angle-of-departure spread, a zenith angle-of-arrival spread, a shadow fading, a number of a multipath cluster, a number of rays in the multipath cluster, an intra-cluster delay spread, an intra-cluster azimuth angle-of-departure spread, an intra-cluster azimuth angle-of-arrival spread, an intra-cluster zenith angle-of-departure spread, an intra-cluster zenith angle-of-arrival spread, and an intra-cluster shadow fading distribution.

Optionally, as an embodiment, the processing unit 310 is further configured to: determine the sample structure.

Optionally, as an embodiment, the transceiving unit 320 is configured to receive sample structure information sent by a third device; and the processing unit 310 is configured to determine the sample structure according to the sample structure information.

Optionally, as an embodiment, the processing unit 310 is configured to: determine the model structure of the channel state information indicator model; and determine the sample structure corresponding to the model structure.

Optionally, as an embodiment, the processing unit 310 is configured to determine the channel state information indicator model according to the training set.

Optionally, as an embodiment, the processing unit 310 is configured to determine the channel state information indicator model according to the training set and the model structure of the channel state information indicator model.

Optionally, as an embodiment, the processing unit 310 is configured to: determine the model structure.

Optionally, as an embodiment, the transceiving unit 320 is configured to receive model structure information sent by a third device; and the processing unit 310 is configured to determine the model structure according to the model structure information.

Optionally, as an embodiment, the transceiving unit 320 is configured to send sample structure information to the second device, where the sample structure information is used by the second device to determine the sample structure.

Optionally, as an embodiment, the transceiving unit 320 is configured to: receive model structure information sent by the third device, where the model structure information is used to indicate the model structure, and the model structure is determined by the third device according to the sample structure; and the processing unit 310 is configured to determine the model structure according to the model structure information.

Optionally, as an embodiment, the processing unit 310 is configured to determine the model structure corresponding to the sample structure.

Optionally, as an embodiment, the transceiving unit 320 is configured to send the channel state information indicator model to the second device.

Optionally, as an embodiment, the transceiving unit 320 is configured to send the training set to the second device.

Optionally, as an embodiment, the transceiving unit 320 is configured to: receive the channel state information indicator model sent by the second device, where the channel state information indicator model is determined by the second device according to the training set.

Optionally, as an embodiment, the transceiving unit 320 is configured to send model structure information to the second device, where the model structure information is used to indicate the model structure of the channel state information indicator model, and the channel state information indicator model is determined by the second device according to the training set and the model structure.

Optionally, as an embodiment, the third device and the second device are the same device.

Optionally, as an embodiment, the first device 300 is a terminal device or a network device; the second device is a terminal device or a network device.

It should be understood that the above-mentioned and other operations and/or functions of the units in the first device 300 of the embodiments of the present application are used to implement the corresponding processes of the first device in the respective methods in FIGS. 1 to 10, which are not elaborated here for brevity.

Therefore, the first device of the embodiments of the present application reasonably sets the structural characteristics of the samples in the training set, and simplifies the structural characteristics of the samples in the training set. Since the training set is the basis for a neural network model to work effectively and efficiently, it can improve the efficiency of channel state information indication through the neural network model.

Figure 12:
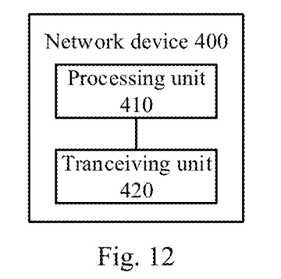
FIG. 12 is a schematic block diagram of a second terminal device according to an embodiment of the present application.

As shown in FIG. 12, the second device 400 for transmitting channel state information according to an embodiment of the present application includes: a processing unit 410; optionally, it may also include a transceiving unit 420. Specifically, the processing unit 410 is configured to determine a channel state information indicator model, the channel state information indicator model is used for the second device and the first device to transmit channel state information, and the channel state information indicator model is determined based on the training set, the sample structures of several samples included in the training set are determined according to M*N matrix structure, each row in the M rows of the matrix structure corresponds to multiple subcarriers in the frequency domain or corresponds to a preset duration in the time domain, each of the N columns of the matrix structure corresponds to at least one antenna in the spatial domain or corresponds to a preset angle in the spatial domain, and each value in the matrix structure represents the channel quality of the corresponding frequency domain and spatial domain, or represents the channel quality of the corresponding time domain and spatial domain, and M and N are positive integers.

Optionally, as an embodiment, the sample structure is any one of the following: the M*N matrix structure, a N*M matrix structure, an m*N matrix structure, an M*n matrix structure, an m*n matrix structure, a 1*(M*N) vector structure, and a (M*N)*1 vector structure, where m rows in the m*N matrix structure or the m*n matrix structure are a part of M rows, M is greater than m, n columns in the M*n matrix structure or the m*n matrix structure are a part of the N columns, and N is greater than n.

Optionally, as an embodiment, the transceiving unit 420 is configured to receive the channel state information indicator model sent by the first device.

Optionally, as an embodiment, the transceiving unit 420 is configured to send sample structure information to the first device, where the sample structure information is used by the first device to determine the sample structure, and the sample structure is used by the first device to determine the channel state information indicator model.

Optionally, as an embodiment, the transceiving unit 420 is configured to send model structure information to the first device, where the model structure information is used by the first device to determine the model structure of the channel state information indicator model. The model structure is used by the first device to determine the channel state information indicator model.

Optionally, as an embodiment, the transceiving unit 420 is configured to: receive sample structure information sent by the first device, where the sample structure information is used to indicate the sample structure; the processing unit 410 is configured to: according to the sample structure information, determine the model structure of the channel state information indicator model corresponding to the sample structure; the transceiving unit 420 is configured to send model structure information to the first device, the model structure information is used to indicate the model structure, and the model structure is used by the first device to determine the channel state information indicator model.

Optionally, as an embodiment, the transceiving unit 420 is configured to: receive the training set sent by a third device; the processing unit 410 is configured to: determine the channel state information indicator model according to the training set.

Optionally, as an embodiment, the processing unit 410 is configured to: determine a model structure of the channel state information indicator model; and determine the channel state information indicator model according to the training set and the model structure.

Optionally, as an embodiment, the transceiving unit 420 is configured to: send sample structure information to the third device, where the sample structure information is used by the third device to determine the sample structure, and the sample structure is used by the third device to determine the training set.

Optionally, as an embodiment, the transceiving unit 420 is configured to: receive sample structure information sent by the third device, where the sample structure information is used to indicate the sample structure; the processing unit 410 is configured to: determine the model structure corresponding to the sample structure.

Optionally, as an embodiment, the transceiving unit 420 is configured to receive model structure information sent by the third device; the processing unit 410 is configured to determine the model structure according to the model structure information.

Optionally, as an embodiment, the transceiving unit 420 is further configured to send the channel state information indicator model to the first device.

Optionally, as an embodiment, the third device and the first device are the same device.

Optionally, as an embodiment, the first device is a terminal device or a network device; the second device is a terminal device or a network device.

It should be understood that the foregoing and other operations and/or functions of each unit in the second device 400 in the embodiments of the present application are used to implement the corresponding processes of the second device or the third device in the methods in FIGS. 1 to 10, respectively, which are not elaborated here for brevity.

Therefore, the second device of the embodiments of the present application reasonably sets the structural characteristics of the samples in the training set, and simplifies the structural characteristics of the samples in the training set. Since the training set is the basis for a neural network model to work effectively and efficiently, it can improve the efficiency of channel state information indication through the neural network model.

Figure 13:
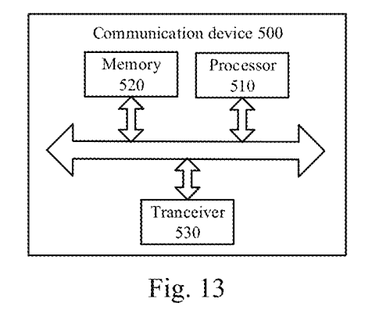
FIG. 13 is a schematic block diagram of a communication device provided by an embodiment of the present application.

FIG. 13 is a schematic structural diagram of a communication device 500 provided by an embodiment of the present application. The communication device 500 shown in FIG. 13 includes a processor 510, and the processor 510 may call and run a computer program from the memory to implement the method in the embodiments of the present application.

Optionally, as shown in FIG. 13, the communication device 500 may further include a memory 520. The processor 510 may call and run a computer program from the memory 520 to implement the method in the embodiments of the present application.

The memory 520 may be a separate device independent of the processor 510, or may be integrated in the processor 510.

Optionally, as shown in FIG. 13, the communication device 500 may further include a transceiver 530, and the processor 510 may control the transceiver 530 to communicate with other device(s). Specifically, it may send information or data to other device(s), or receive information or data sent by other device(s).

The transceiver 530 may include a transmitter and a receiver. The transceiver 530 may further include an antenna, and the number of antennas may be one or more.

Optionally, the communication device 500 may specifically be the network device in the embodiments of the present application, and the communication device 500 may implement the corresponding process implemented by the network device in each method of the embodiments of the present application. For the sake of brevity, details are not repeated here.

Optionally, the communication device 500 may specifically be a mobile terminal/terminal device of the embodiments of the present application, and the communication device 500 may implement the corresponding process implemented by the mobile terminal/terminal device in each method of the embodiments of the present application. For the sake of brevity, details are not repeated here.

Figure 14:
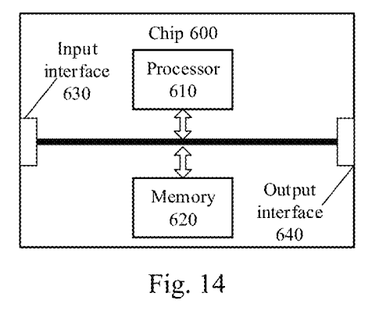
FIG. 14 is a schematic block diagram of a chip provided by an embodiment of the present application.

FIG. 14 is a schematic structural diagram of a chip of an embodiment of the present application. The chip 600 shown in FIG. 14 includes a processor 610, and the processor 610 may call and run a computer program from the memory to implement the method in the embodiments of the present application.

Optionally, as shown in FIG. 14, the chip 600 may further include a memory 620. The processor 610 may call and run a computer program from the memory 620 to implement the method in the embodiments of the present application.

The memory 620 may be a separate device independent of the processor 610, or may be integrated in the processor 610.

Optionally, the chip 600 may further include an input interface 630. The processor 610 may control the input interface 630 to communicate with other device(s) or chip(s), and specifically, may obtain information or data sent by other device(s) or chip(s).

Optionally, the chip 600 may further include an output interface 640. The processor 610 may control the output interface 640 to communicate with other device(s) or chip(s), and specifically, may output information or data to other device(s) or chip(s).

Optionally, the chip may be applied to the network device in the embodiments of the present application, and the chip may implement the corresponding process implemented by the network device in the various method of the embodiments of the present application. For the sake of brevity, details are not described herein again.

Optionally, the chip may be applied to the mobile terminal/terminal device in the embodiments of the present application, and the chip may implement the corresponding process implemented by the mobile terminal/terminal device in the various methods of the embodiments of the present application. For the sake of brevity, details are not described herein again.

It should be understood that the chip mentioned in the embodiments of the present application may also be called a system-level chip, a system chip, a chip system, or a system-on-chip, etc.

Figure 15:
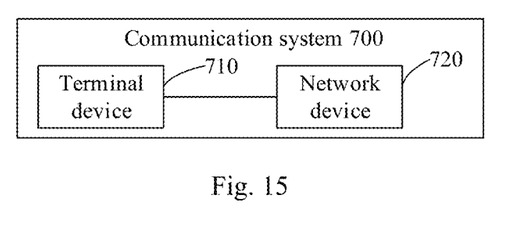
FIG. 15 is a schematic diagram of a communication system provided by an embodiment of the present application.

FIG. 15 is a schematic block diagram of a communication system 700 according to an embodiment of the present application. As shown in FIG. 15, the communication system 700 includes a terminal device 710 and a network device 720.

The terminal device 710 may be used to implement the corresponding function implemented by the terminal device in the above method, and the network device 720 may be used to implement the corresponding function implemented by the network device in the above method. For the sake of brevity, details are not described herein again.

It should be understood that the processor of the embodiments of the present application may be an integrated circuit chip with signal processing capability. In the implementation process, the steps of the foregoing method embodiments may be completed by hardware integrated logic circuits in the processor or instructions in the form of software. The aforementioned processor may be a general-purpose processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application may be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module may be located in a mature storage medium in the art, such as a random access memory, a flash memory, a read-only memory, a programmable read-only memory, or an electrically erasable programmable memory, a register. The storage medium is located in the memory, and the processor reads the information in the memory and completes the steps of the above method in combination with its hardware.

It can be understood that the memory in the embodiments of the present application may be a volatile memory or a non-volatile memory, or may include both volatile memory and non-volatile memory. Among them, the non-volatile memory may be a Read-Only Memory (ROM), a Programmable ROM (PROM), an Erasable PROM (EPROM), and an Electrically EPROM (EEPROM) or a flash memory. The volatile memory may be a Random Access Memory (RAM), which is used as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these and any other suitable types of memories.

It should be understood that the foregoing memories are exemplary but not restrictive. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. In other words, the memories in the embodiments of the present application are intended to include, but are not limited to, these and any other suitable types of memory.

The embodiments of the present application also provide a computer-readable storage medium for storing computer programs.

Optionally, the computer-readable storage medium may be applied to the network device in the embodiments of the present application, and the computer program causes the computer to execute the corresponding process implemented by the network device in each method of the embodiments of the present application, which are not repeated here for the sake of brevity.

Optionally, the computer-readable storage medium may be applied to the mobile terminal/terminal device in the embodiments of the present application, and the computer program causes the computer to execute the corresponding process implemented by the mobile terminal/terminal device in each method of the embodiments of the present application, which are not repeated here for the sake of brevity.

The embodiments of the present application also provide a computer program product, including computer program instructions.

Optionally, the computer program product may be applied to the network device in the embodiments of the present application, and the computer program instructions cause the computer to execute the corresponding process implemented by the network device in each method of the embodiments of the present application, which are not repeated here for the sake of brevity.

Optionally, the computer program product may be applied to the mobile terminal/terminal device in the embodiments of the present application, and the computer program instructions cause the computer to execute the corresponding process implemented by the mobile terminal/terminal device in each method of the embodiments of the present application, which are not repeated here for the sake of brevity.

The embodiment of the present application also provides a computer program.

Optionally, the computer program may be applied to the network device in the embodiments of the present application. When the computer program runs on a computer, it causes the computer to execute the corresponding process implemented by the network device in each method of the embodiments of the present application, which are not repeated here for the sake of brevity.

Optionally, the computer program may be applied to the mobile terminal/terminal device in the embodiments of the present application. When the computer program runs on a computer, it causes the computer to execute the corresponding process implemented by the mobile terminal/terminal device in each method of the embodiments of the present application, which are not repeated here for the sake of brevity.

A person of ordinary skill in the art may be aware that the units and algorithm steps of the examples described in combination with the embodiments disclosed herein may be implemented by electronic hardware or a combination of computer software and electronic hardware. Whether these functions are executed by hardware or software depends on the specific application and design constraint conditions of the technical solution. Professionals and technicians may use different methods for each specific application to implement the described functions, but such implementation should not be considered beyond the scope of the present application.

Those skilled in the art can clearly understand that, for the convenience and conciseness of description, the specific working process of the above-described system, apparatus, and unit may refer to the corresponding process in the foregoing method embodiments, which are not elaborated here.

In the several embodiments provided in the present application, it should be understood that the disclosed system, apparatus, and method may be implemented in other ways. For example, the apparatus embodiments described above are only illustrative. For example, the division of the units is only a logical function division, and there may be other divisions in actual implementation, for example, a plurality of units or components may be combined or may be integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on a plurality of network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the function is implemented in the form of a software functional unit and sold or used as an independent product, it may be stored in a computer readable storage medium. Based on this understanding, the essence of the technical solution or the part that contributes to the related art or the part of the technical solution in the present application may be embodied in the form of a software product, and the computer software product is stored in a storage medium, which includes several instructions for enabling a computer device (which may be a personal computer, a server, or a network device, etc.) to execute all or part of the steps of the methods described in the various embodiments of the present application. The aforementioned storage media include: a U disk, a mobile hard disk, a Read-Only Memory (ROM), a Random Access Memory (RAM), a magnetic disk, an optical disk, or other media that can store program codes.

The above contents are only specific implementations of the present application, and the protection scope of the present application is not limited thereto. Any person skilled in the art can easily think of changes or substitutions within the technical scope disclosed in the present application, which should be covered within the scope of protection of the present application. Therefore, the protection scope of the present application should be subject to the protection scope of the claims.

What is claimed is:

1. A method for transmitting channel state information, comprising:
    constructing, by a first device, a training set of channel state information indicator model, wherein the channel state information indicator model is used by the first device and a second device to transmit channel state information,
    sample structures of several samples comprised in the training set are determined according to an M*N matrix structure, each of M rows of the matrix structure corresponds to a plurality of subcarriers in a frequency domain or corresponds to a preset duration in a time domain, each of N columns of the matrix structure corresponds to at least one antenna in a spatial domain or corresponds to a preset angle in the spatial domain, and each value in the matrix structure represents a channel quality in the corresponding frequency domain and spatial domain, or represents a channel quality in the corresponding time domain and spatial domain, and M and N are positive integers.

2. A first device for transmitting channel state information, comprising:
    a processor and a memory, wherein the memory is configured to store a computer program, and the processor is configured to call and run the computer program stored in the memory to:
    construct a training set of channel state information indicator model, wherein the channel state information indicator model is used by the first device and a second device to transmit channel state information,
    sample structures of several samples comprised in the training set are determined according to an M*N matrix structure, each row of M rows of the matrix structure corresponds to a plurality of subcarriers in a frequency domain or corresponds to a preset duration in a time domain, each of N columns of the matrix structure corresponds to at least one antenna in a spatial domain or corresponds to a preset angle in the spatial domain, and each value in the matrix structure represents a channel quality in the corresponding frequency domain and spatial domain, or represents a channel quality in the corresponding time domain and spatial domain, and M and N are positive integers.

3. The first device according to claim 2, wherein the processor is further configured to perform at least one of following steps:
    when each of the M rows of the matrix structure corresponds to a plurality of subcarriers in the frequency domain, transforming each of the M rows of the matrix structure to correspond to the preset duration in the time domain by Fourier transform;
    when each of the M rows of the matrix structure corresponds to the preset duration in the time domain, transforming each of the M rows of the matrix structure to correspond to a plurality of subcarriers in the frequency domain by Fourier transform;
    when each of the N columns of the matrix structure corresponds to at least one antenna in the spatial domain, transforming each of the N columns of the matrix structure to correspond to the preset angle in the spatial domain by Fourier transform; and
    when each of the N columns of the matrix structure corresponds to the preset angle in the spatial domain, transforming each of the N columns of the matrix structure to correspond to at least one antenna in the spatial domain by Fourier transform.

4. The first device according to claim 2, wherein the processor is configured to:
    according to a delay requirement, retain the values from a first row to a $m^{th}$ row in the M rows of the matrix structure, and delete the values of the last M−m rows in the M rows of the matrix structure, wherein M is greater than m, and the sample structure comprises m rows,
    wherein a time domain range corresponding to each row in the first m rows of the matrix structure is less than or equal to a threshold value, and a time domain range corresponding to each row in the last M−m rows is greater than the threshold value.

5. The first device according to claim 2, wherein the processor is further configured to:
    transform the N columns of the matrix structure into n columns, wherein N is greater than n, and the sample structure comprises n columns,
    wherein the processor is further configured to:
    randomly retain the values of n columns in the N columns of the matrix structure and delete the values of other N−n columns in the N columns of the matrix structure; or,
    retain only one column in every k columns from the first column in the N columns of the matrix structure and delete other k−1 columns in every k columns; or,
    combine every k columns from the first column in the N columns of the matrix structure into one column.

6. The first device according to claim 2, wherein the sample structure is any one of the following:
    the M*N matrix structure, an N*M matrix structure, a 1*(M*N) vector structure, and a (M*N)*1 vector structure.

7. The first device according to claim 2, wherein a factor affecting a difference between any two samples in the several samples comprises at least one of the following:
    a delay spread, an azimuth angle-of-departure spread, an azimuth angle-of-arrival spread, a zenith angle-of-departure spread, a zenith angle-of-arrival spread, a shadow fading, a number of a multipath cluster, a number of rays in the multipath cluster, an intra-cluster delay spread, an intra-cluster azimuth angle-of-departure spread, an intra-cluster azimuth angle-of-arrival spread, an intra-cluster zenith angle-of-departure spread, an intra-cluster zenith angle-of-arrival spread, and an intra-cluster shadow fading distribution.

8. The first device according to claim 2, wherein the processor is further configured to:
determine the sample structure.

9. The first device according to claim 8, wherein the first device further comprises:
a transceiver, configured to receive sample structure information sent by a third device; and
the processor is further configured to:
determine the sample structure according to the sample structure information,
or,
wherein the processor is further configured to:
determine a model structure of the channel state information indicator model; and
determine the sample structure corresponding to the model structure.

10. The first device according to claim 2, wherein the processor is further configured to:
determine the channel state information indicator model according to the training set,
wherein the processor is further configured to:
determine the channel state information indicator model according to the training set and a model structure of the channel state information indicator model.

11. The first device according to claim 10, wherein the processor is further configured to:
determine the model structure.

12. The first device according to claim 9, wherein the first device further comprises:
a transceiver, configured to receive model structure information sent by a third device; and
the processor is further configured to:
determine the model structure according to the model structure information.

13. The first device according to claim 12, wherein the first device further comprises:
a transceiver, configured to send sample structure information to the second device, wherein the sample structure information is used by the second device to determine the sample structure,
wherein the transceiver is further configured to:
receive model structure information sent by the third device, wherein the model structure information is used to indicate the model structure, and the model structure is determined by the third device according to the sample structure; and
the processor is further configured to:
determine the model structure according to the model structure information.

14. The first device according to claim 11, wherein the processor is further configured to:
determine the model structure corresponding to the sample structure.

15. The first device according to claim 10, wherein the first device further comprises:
a transceiver, configured to send the channel state information indicator model to the second device.

16. The first device according to claim 2, wherein the first device further comprises:
a transceiver, configured to send the training set to the second device.

17. The first device according to claim 16, wherein the transceiver is further configured to:
receive the channel state information indicator model sent by the second device, wherein the channel state information indicator model is determined by the second device according to the training set.

18. The first device according to claim 17, wherein the transceiver is further configured to:
send model structure information to the second device, wherein the model structure information is used to indicate a model structure of the channel state information indicator model, and the channel state information indicator model is determined by the second device according to the training set and the model structure.

19. The first device according to claim 9, wherein the third device and the second device are the same device.

20. A second device for transmitting channel state information, comprising:
a processor and a memory, wherein the memory is configured to store a computer program, and the processor is configured to call and run the computer program stored in the memory to:
determine a channel state information indicator model, wherein the channel state information indicator model is used by the second device and a first device to transmit channel state information, the channel state information indicator model is determined according to a training set, sample structures of several samples comprised in the training set are determined according to an M*N matrix structure, each of M rows of the matrix structure corresponds to a plurality of subcarriers in a frequency domain or corresponds to a preset duration in a time domain, each of N columns of the matrix structure corresponds to at least one antenna in the spatial domain or corresponds to a preset angle in the spatial domain, each value in the matrix structure represents a channel quality in the corresponding frequency domain and spatial domain, or represents a channel quality in the corresponding time domain and spatial domain, and M and N are positive integers.

* * * * *